July 18, 1939.  W. J. TAYLOR ET AL  2,166,381
CONFECTION MACHINE
Original Filed July 9, 1936  2 Sheets-Sheet 1
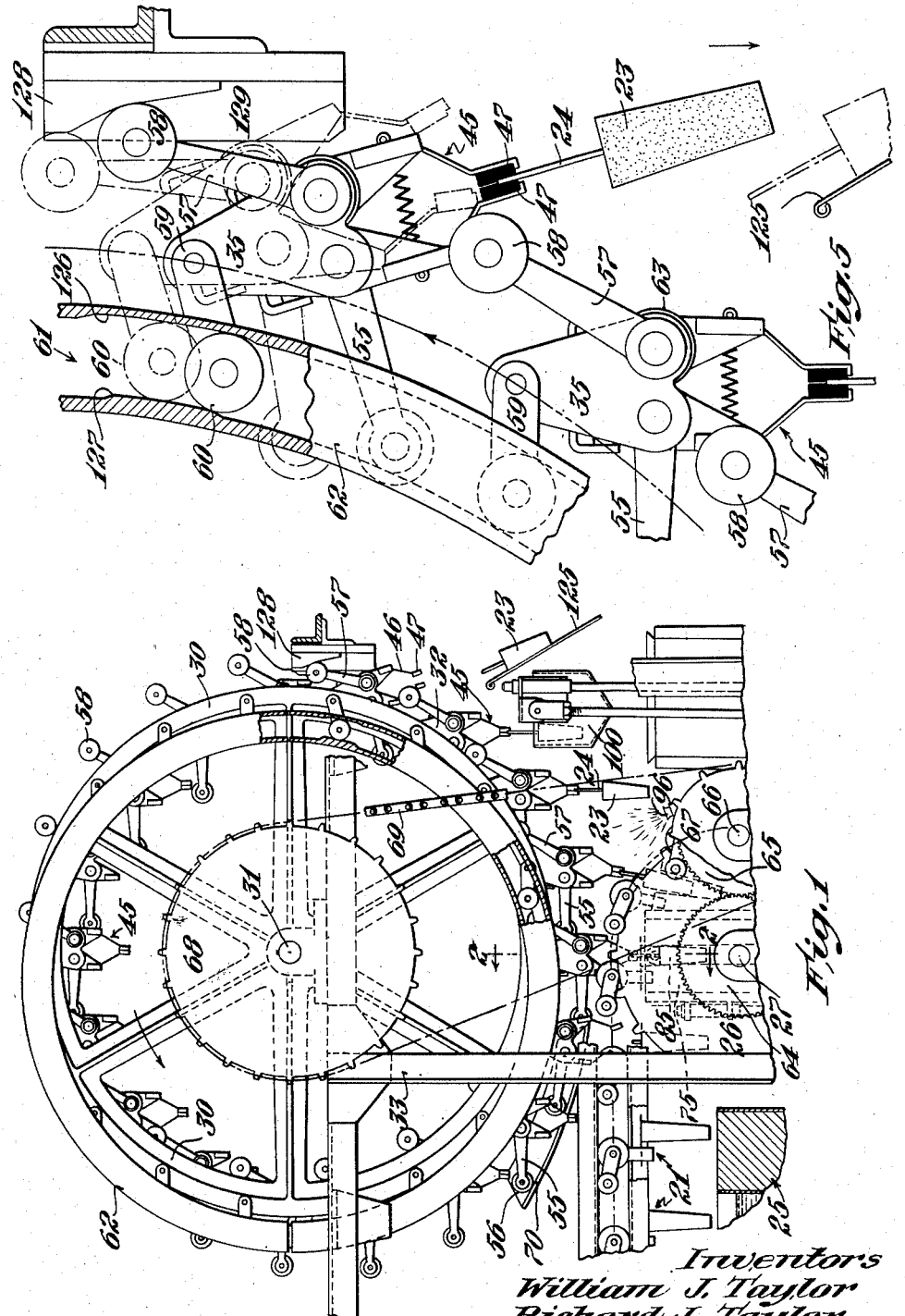
Inventors
William J. Taylor
Richard J. Taylor
by Roberts, Cushman & Woodberry
Attys July 18, 1939.  W. J. TAYLOR ET AL  2,166,381
CONFECTION MACHINE
Original Filed July 9, 1936   2 Sheets-Sheet 2
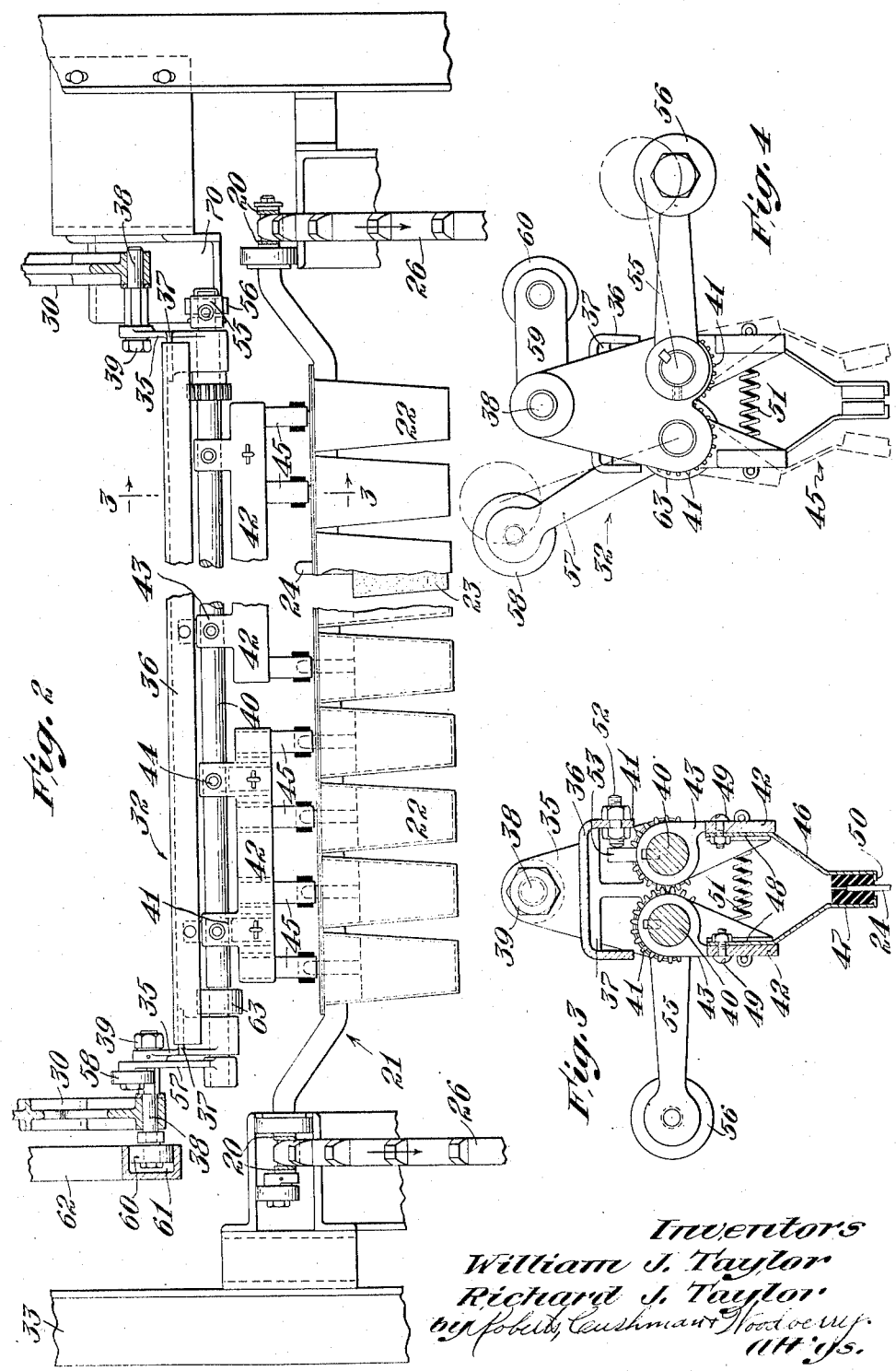
Inventors
William J. Taylor
Richard J. Taylor Patented July 18, 1939

2,166,381

UNITED STATES PATENT OFFICE 2,166,381

CONFECTION MACHINE

William J. Taylor and Richard John Taylor, Syracuse, N. Y., assignors to The Lamson Company, Syracuse, N. Y., a corporation of Massachusetts Original application July 9, 1936, Serial No. 89,733. Divided and this application December 18, 1936, Serial No. 116,468

2 Claims. (Cl. 198—210)

This invention relates to an improvement in a confection machine of the general type illustrated and described in the patent to Robb, No. 1,960,456, dated May 29, 1934 and more particularly in the gripper mechanism thereof, and this application is a division of our copending application Serial No. 89,733, filed July 9, 1936.

A confection machine of this type comprises briefly a conveyor on which are supported a plurality of mold carriers, a filling unit by which the molds of the carriers are supplied with confection forming material in fluid or semi-viscous condition, a stick inserting unit, a chilling unit (usually a brine tank), a conveyor on which a plurality of gripper carriers are supported, means for defrosting the confections frozen in the molds whereby they are loosened therefrom so that the confections may be removed from the molds by the grippers which seize the sticks frozen in the confections, means for coating the confections while carried by the grippers, and means for packaging the coated confections.

The primary object of the invention forming the subject matter of this invention is to provide a conveyor in a machine of this type with gripper mechanism for grasping the sticks of the confections, transporting the confections to a coating unit, holding the confections while being coated, transporting the coated confections to a point of discharge and releasing them thereat. Further objects reside in the structure of the gripper mechanism, the means for tilting the grippers, and the provision of two independently operating means for opening the grippers.

In the drawings which illustrate such form:

Fig. 1 is a view in side elevation of a portion of a unit embodying this invention;

Fig. 2 is an enlarged sectional view taken along the line 2—2 in Fig. 1 illustrating a mold carrier and a gripper carrier, the sticks of the confections in the molds being seized by the grippers;

Fig. 3 is an enlarged cross-sectional view of a gripper taken along the line 3—3 in Fig. 2;

Fig. 4 is a side elevation of a gripper carrier, taken from the right in Fig. 2, the gripper jaws being shown closed by full lines and opened by dotted lines; and Fig. 5 is an enlarged view in side elevation with parts broken away illustrating the positions of a gripper carrier as the confection is coated and as the coated confection is released.

In the embodiment of this invention illustrated in the drawings, the confections are presented to the gripper mechanism by which they are seized, removed, coated and discharged by a conveyor comprising a pair of chains 20 between which are supported a plurality of mold carriers 21. The carriers 21 comprise a plurality of molds 22 each of which contains a frozen confection 23 from the top of which projects a stick 24. The mold carriers, as shown in Fig. 1, are advanced through a brine tank 25, in which the confections are frozen, leaving it just before they reach the gripper mechanism. The chains 20 are continuously driven by means not shown and pass over sprockets 26 on stub shafts 27.

The gripper mechanism comprises a pair of parallel wheels 30 mounted upon a shaft 31 and pivotally supporting a plurality of gripper carriers 32. The shaft 31 is suitably supported directly above and in parallel alignment with the shafts 27. The frame 33 serves as a support for the shafts 27, 29 and 31 and various other elements which will be hereinafter described.

Each gripper carrier 32 comprises a pair of end plates 35 connected by a U-shaped cross-plate 36 supported at its ends upon shelves 37 projecting inwardly from the end plates and here shown as integral therewith. The end plates 35 are fixed upon the inner ends of stub shafts 38 by means of nuts 39. Supported in bearings in the end plates 35 are a pair of parallel shafts 40 provided with intermeshing gears 41. Pairs of parallel bars 42 are suspended from the shafts 40 by integral arms 43, the upper ends of which surround and are fixed upon the shafts by set screws 44.

Carried by the bars 42 are a plurality of gripper units 45 each comprising spring arms 46 and jaws 47. The upper end of each arm 46 is seated in a recess formed on the inner face of a bar 42 by bosses 48 and secured therein by a nut and bolt assembly 49. The jaws 47 preferably comprise rubber blocks supported on flanges 50 formed at the lower ends of the arms. The jaws 47 are normally held closed by the action of a spring 51 limited by the coaction of screw 52 adjustable in a flange of the plate 36 and a finger 53 projecting upwardly from an arm 43.

In the illustrated embodiment, the gripper mechanism includes twelve gripper units 45 divided into three groups of four grippers each, each group being carried by a pair of bars 42. There are also twelve molds 22 in each mold carrier 21, and as shown in Fig. 2 each gripper registers with a mold in a position to seize a stick 24 of the confection therein.

At the right end (Fig. 2) of one shaft 40 is an arm 55 carrying at its outer end a roller 56, and at the left end (Fig. 2) of the other shaft 40 is an arm 57 carrying at its outer end a roller 58. The arms are keyed or held by set screws to the shafts. The stub shafts 36 are freely rotatable in bearings in the wheels 30 and at the outer end of one shaft 38, that at the left in Fig. 2, is fixed an arm 59 carrying a roller 60. The roller 60 of each gripper unit rides at all times in a track 61 formed by a U-shaped ring 62 mounted on the frame eccentrically with respect to the shaft 31. Freely rotatable on the shaft 40 carrying the arm 57 is a sleeve 63. As will be set forth, the rollers 56 and 58 serve to open and close the grippers 45 and the roller 60 and sleeve 63 serve to tilt the gripper carrier as a unit.

The wheels 30 are driven in unison with the mold conveyor. As here shown, the wheels are rotated from a gear 64 fixed on the shaft 27 of a sprocket 26 which is driven by a chain 20 of the mold conveyor. The gear 64 meshes with a gear 65 on a stub shaft 66, which is carried by the frame 33, and on which is fixed a sprocket 67 connected with a sprocket 68 on the shaft 31 by a chain 69.

As the wheels are rotated, the rollers 60 of the gripper carriers travel in the track 61 formed by the ring 62, thus steadying the units and holding them normally in the preferred vertical position. Mounted adjacent the wheels 30 is a stationary cam plate 70 with which the rollers 56 of the gripper carriers engage as the units approach register with the mold carriers. The grippers are thereby opened so that they extend at either side of the sticks 24 projecting from the confections in the molds, and when the rollers 56 leave the cam 70 the springs 51 close the gripper jaws and seize the sticks.

The paths of the grippers and molds diverge from this position of registering and it is one function of the grippers to remove the confections from the molds. However, the confections having been frozen in the molds are attached to the walls of the molds and it is necessary to loosen this contact. Preferably heat is applied to the walls of the molds which will melt the contacting surfaces of the confections. In the illustrated embodiment, this heat is applied by means of a tank 75 containing water at the proper temperature into which the molds are momentarily plunged.

The tank 75 extends across the machine and is of sufficient size to contain all the molds of a mold carrier at the same time. When a mold carrier is in register with a gripper carrier, the tank 75 is raised so that all the molds of the carrier are immersed in heated water.

The raising and lowering of the tank is in timed relation to the travel of the mold carriers. The tank is raised to the upper position just long enough to defrost the molds of a mold carrier, and then lowered out of the path of travel of the mold carriers to allow the defrosted carrier to proceed, without interference. Each carrier is thus defrosted.

The gripper units remove the loosened confections from the molds as the paths diverge. A nozzle 96 blows cool air upon the confections to chill the outer surfaces. The confections are thereafter coated while still carried by the gripper units. This coating is performed by a tank 100 which like the tank 75 is raised and lowered in timed relation to the travel of the confections.

The coated confections are then discharged from the gripper units onto a chute 125 by which they are conducted to a station (not shown) at which the confections are bagged, wrapped or otherwise packaged.

Before the confections are released, it is desirable that the gripper units should be tilted as shown in Figs. 1 and 5. The rollers 60 in the track 61 are deflected slightly from their normal path by a recess 126 in the outer leg of the ring 62 and a complementary projection 127 on the inner leg of the ring. The gripper carriers 32 are thereby tilted outwardly from their normal substantially vertical positions. This movement of the gripper carrier brings the roller 58 into contact with a stationary cam 128 and opens the jaws 47 releasing the sticks 24 and allowing the confections to drop onto the chute 125. In order to limit this tilting movement and insure the opening of the jaws, a stationary guide bar 129 is provided against which the sleeve 63 rests. After passing the recess 126 and the projection 127, the gripper carrier resumes its normal position and the jaws close as soon as the roller 59 leaves the cam 128.

The various moving elements are all actuated from a common source, the driving means for the mold carrier conveyor, and thus operate continuously and in timed relation to one another whereby the various operations take place without delaying the progress of the confections in any way.

While one embodiment of this invention has been shown and described, it will be understood that the invention is not limited thereto and that other embodiments of the invention may be made without departing from the spirit and scope thereof as set forth in the following claims.

We claim:

1. In a confection machine, a conveyor wheel, means for rotating said conveyor wheel continuously upon a horizontal axis, the conveyor wheel including a plurality of gripper carriers each comprising a rotatable shaft having a roller at one end thereof and a plurality of grippers carried by the shaft, a stationary track which receives the carrier rollers and is mounted eccentrically of the conveyor wheel axis, said track causing the grippers to assume normally vertical positions, and means for opening and closing said grippers as they pass through certain points during the rotation of the conveyor wheel.

2. In a confection machine, a conveyor wheel, means for rotating said conveyor wheel continuously upon a horizontal axis, the conveyor wheel including a plurality of gripper carriers each comprising a rotatable shaft having a roller at one end thereof and a plurality of grippers carried by the shaft, a stationary track which receives the carrier rollers and is mounted eccentrically of the conveyor wheel axis, said track causing the grippers to assume normally vertical positions, means for opening and closing said grippers as they pass through certain points during the rotation of the conveyor wheel, and means for tilting said grippers as they pass through one of said points, said last-named means acting upon the gripper carriers and comprising a projection in one wall of the track and a complementary recess in the other wall of the track, said projection and recess coacting upon the rollers of the gripper carriers.

RICHARD J. TAYLOR.
WILLIAM J. TAYLOR.